(12) United States Patent
Koga

(10) Patent No.: US 7,503,537 B2
(45) Date of Patent: Mar. 17, 2009

(54) POWER SEAT SLIDE APPARATUS

(75) Inventor: Yoshitaka Koga, Chiryu (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 11/855,629

(22) Filed: Sep. 14, 2007

(65) Prior Publication Data
US 2008/0078908 A1 Apr. 3, 2008

(30) Foreign Application Priority Data
Sep. 28, 2006 (JP) ............................. 2006-264627

(51) Int. Cl.
F16M 13/00 (2006.01)
B60N 2/02 (2006.01)
(52) U.S. Cl. ..................... 248/429; 248/419; 296/65.14
(58) Field of Classification Search ................ 248/429, 248/424, 419; 296/65.14, 65.15
See application file for complete search history.

(56) References Cited

U.S. PATENT DOCUMENTS

| 4,645,159 A * | 2/1987 | Terada et al. ................ 248/429 |
| 5,150,872 A * | 9/1992 | Isomura ....................... 248/429 |
| 5,516,071 A * | 5/1996 | Miyauchi .................... 248/429 |
| 5,709,364 A * | 1/1998 | Araki et al. .................. 248/421 |
| 6,220,642 B1 * | 4/2001 | Ito et al. ...................... 296/65.14 |
| 6,260,922 B1 * | 7/2001 | Frohnhaus et al. .......... 297/330 |
| 6,959,900 B2 * | 11/2005 | Hoshihara et al. ........... 248/429 |
| 7,051,986 B1 * | 5/2006 | Taubmann et al. .......... 248/429 |
| 2007/0108360 A1 | 5/2007 | Ito et al. |

FOREIGN PATENT DOCUMENTS

| JP | 60-166537 | 8/1985 |
| JP | 11-334424 | 12/1999 |
| JP | 2004-345541 | 12/2004 |

* cited by examiner

Primary Examiner—Anita M King
(74) Attorney, Agent, or Firm—Oblon, Spivak, McClelland, Maier & Neustadt, P.C.

(57) ABSTRACT

A power seat slide apparatus includes a lower rail adapted to be provided on a floor of a vehicle, an upper rail slidably supported by the lower rail and adapted to support a seat for a vehicle, a screw member supported by the upper rail and the lower rail, a feed nut member arranged on one of the lower rail and the upper rail and threaded onto the screw member, a retaining bracket arranged on the other one of the lower rail and the upper rail and the screw member being positioned in the retaining bracket, a first engaging member and a second engaging member arranged on the screw member so as to oppose each other via the retaining bracket and cooperatively sandwiching the retaining bracket in an axial direction of the screw member, and a drive unit transmitting a rotating drive force to the screw member.

15 Claims, 6 Drawing Sheets

POWER SEAT SLIDE APPARATUS

CROSS REFERENCE TO RELATED APPLICATIONS

This application is based on and claims priority under 35 U.S.C. §119 to Japanese Patent Application 2006-264627, filed on Sep. 28, 2006, the entire content of which is incorporated herein by reference.

FIELD OF THE INVENTION

This invention generally relates to a power seat slide apparatus.

BACKGROUND

Known power seat slide apparatuses described, for example, in JP11-334424A and JP2004-345541A includes a lower rail fixedly mounted on a floor of a vehicle, an upper rail held by the lower rail so as to slide in a vehicle's longitudinal direction and supporting a seat for a vehicle, a screw shaft provided between the lower rail and the upper rail and extending in a direction of the upper rail's sliding motion, a nut member fixedly mounted on a lower rail and threadably engaged with the screw shaft, a gear box held on an upper rail and connected to an end of the screw shaft and a motor transmitting a drive force to the screw shaft via the gear box, where the screw shaft is rotated by means of motor rotation so that the upper rail slides relative to the lower rail in a longitudinal direction.

The known power seat slide apparatus described in JP 1-334424A includes a worm wheel rotatably supported in a casing of reduction gears and meshed with a worm driven by a drive motor, the worm wheel being integrally connected with an end of the screw shaft by a screw and nut arrangement.

The known power seat slide apparatus described in JP2004-345541A includes a screw member held by an upper rail via a gear box and the screw member's movement, relative to the gear box, in a sliding motion direction of the upper rail is restricted.

However, the power seat slide apparatus described in JP11-334424A includes a structure where the worm wheel and the screw shaft are rigidly fixed and where the screw shaft is supported by the worm wheel and a nut member, and it is therefore difficult to securely support the screw shaft of long length, which attributes to interaction between an engagement of the worm wheel and the worm gear, and an engagement of the screw shaft and the nut member. This may cause irregular sliding motion and/or irregular rotation of the screw shaft, leading to drawbacks, such as for example, a noise attributed to an engagement that is likely to occur when a seat is driven by the motor to slide.

Also, in the power seat slide apparatus described in JP2004-345541A, a load which works on the upper rail in a vehicle's longitudinal direction when a vehicle suddenly stops, is transmitted to the lower rail via the gear box, the screw member, and the nut member in the mentioned order. In other words, the load applied to the upper rail is inputted to the gearbox. Consequently, with the construction of the power seat slide apparatus described in JP2004-345541A, simplification of the structure and of the configuration related to the gear box, namely a size of the gear box, a holding structure of the gear box to the upper rail, and so forth, is difficult because the gear box is required to have a robust structure to withstand the load.

A need thus exists for a power seat slide apparatus which is not susceptible to the drawback mentioned above.

SUMMARY OF THE INVENTION

In light of the foregoing, the present invention provides a power seat slide apparatus, which includes a lower rail adapted to be provided on a floor of a vehicle, an upper rail slidably supported by the lower rail and adapted to support a seat for a vehicle, a screw member supported by the upper rail and the lower rail, a feed nut member arranged on one of the lower rail and the upper rail and threaded onto the screw member, a retaining bracket arranged on the other one of the lower rail and the upper rail and the screw member being positioned in the retaining bracket, a first slide nut member and a second slide nut member arranged on the screw member so as to oppose each other via the retaining bracket and cooperatively sandwiching the retaining bracket in an axial direction of the screw member, and a drive unit transmitting a rotating drive force to the screw member.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
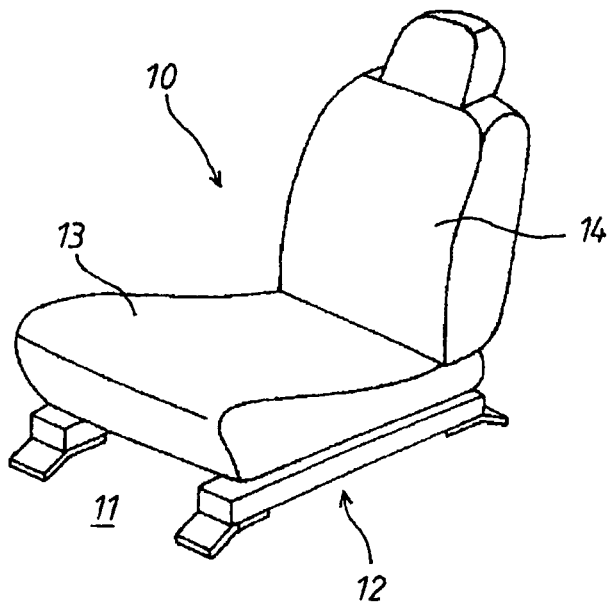
FIG. 1 is a perspective view illustrating a seat for a vehicle.

A first embodiment of the present invention will be described below with reference to the attached drawings. As shown in FIG. 1, a seat 10 for a vehicle mounted on a vehicle floor 11 is provided with a power seat slide apparatus 12. The seat 10 for the vehicle includes a seat cushion 13 forming a seating surface and a seatback 14 forming a seatback surface. The seatback 14 is mounted on a rear portion of the seat cushion 13 by a known reclining appa ratus so as to pivot relative to the seat cushion 13 in a vehicle's longitudinal direction (a direction of a vehicle) and so as to be locked and held at a predetermined adjusted angular position.

Figure 2:
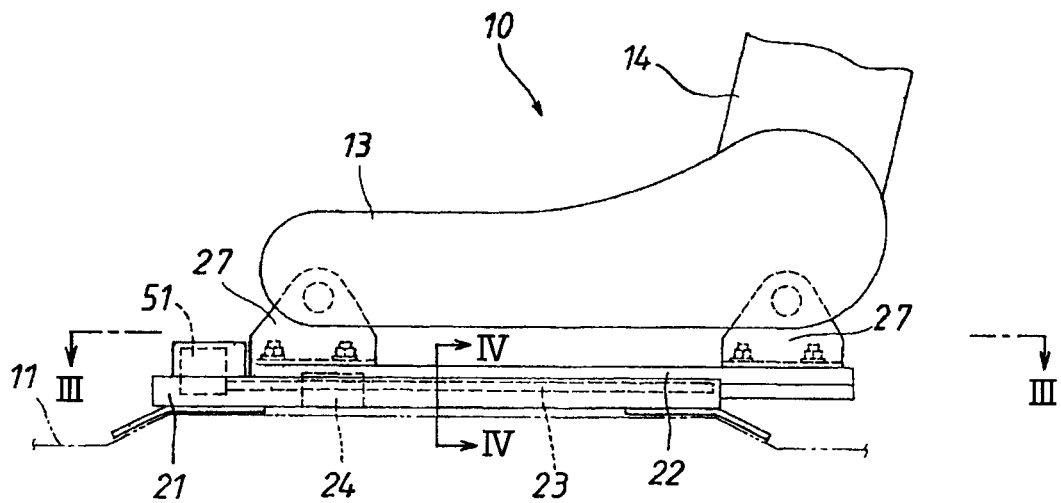
FIG. 2 is a side view illustrating a seat for a vehicle provided with a power seat slide apparatus according to a first embodiment of the invention.
Figure 3:
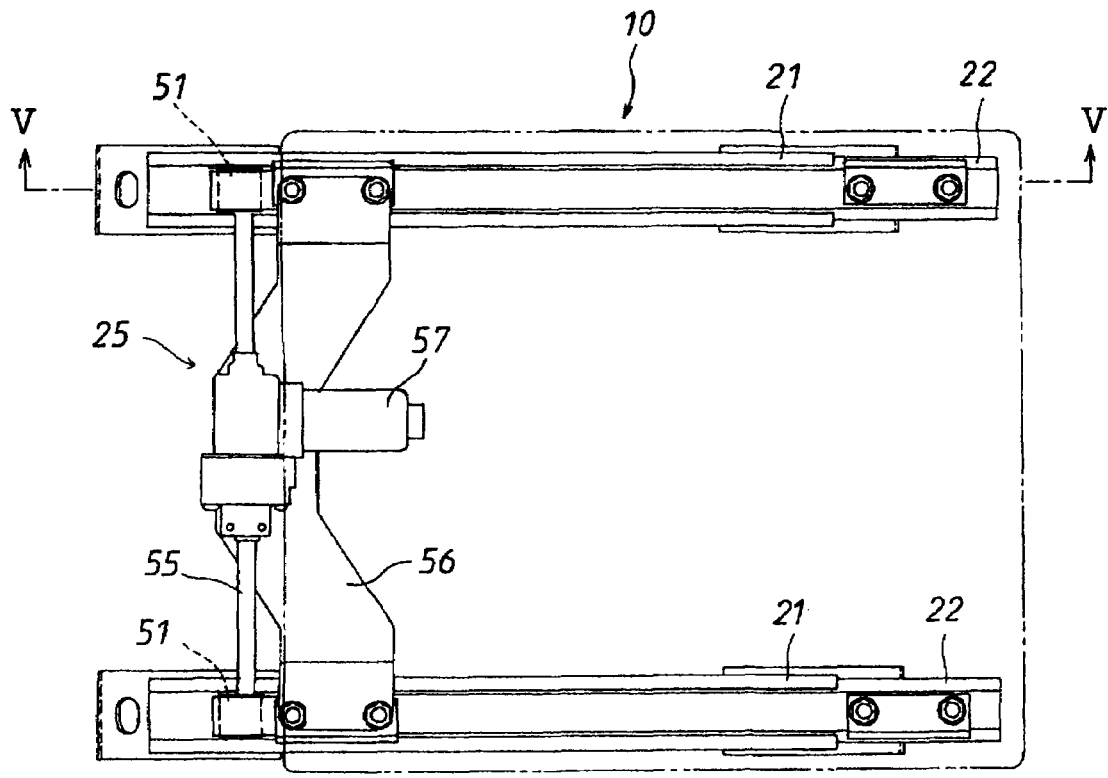
FIG. 3 is a plan view illustrating a power seat slide apparatus taken on line III-III of FIG. 2.

The power seat slide apparatus 12 includes a lower rail 21, an upper rail 22, a screw member 23, a feed nut member 24 and a drive unit 25 as shown in FIG. 2 and FIG. 3.

Figure 4:
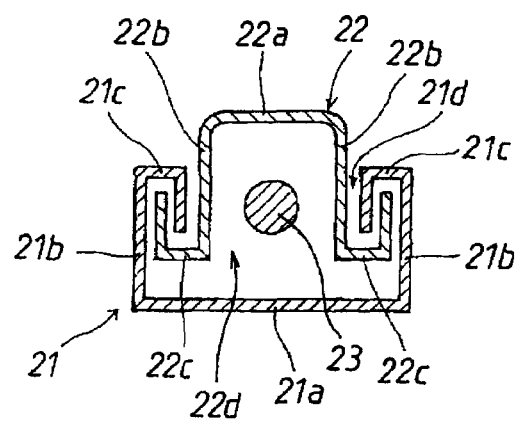
FIG. 4 is a cross section view taken on line IV-IV of FIG. 2.
Figure 7:
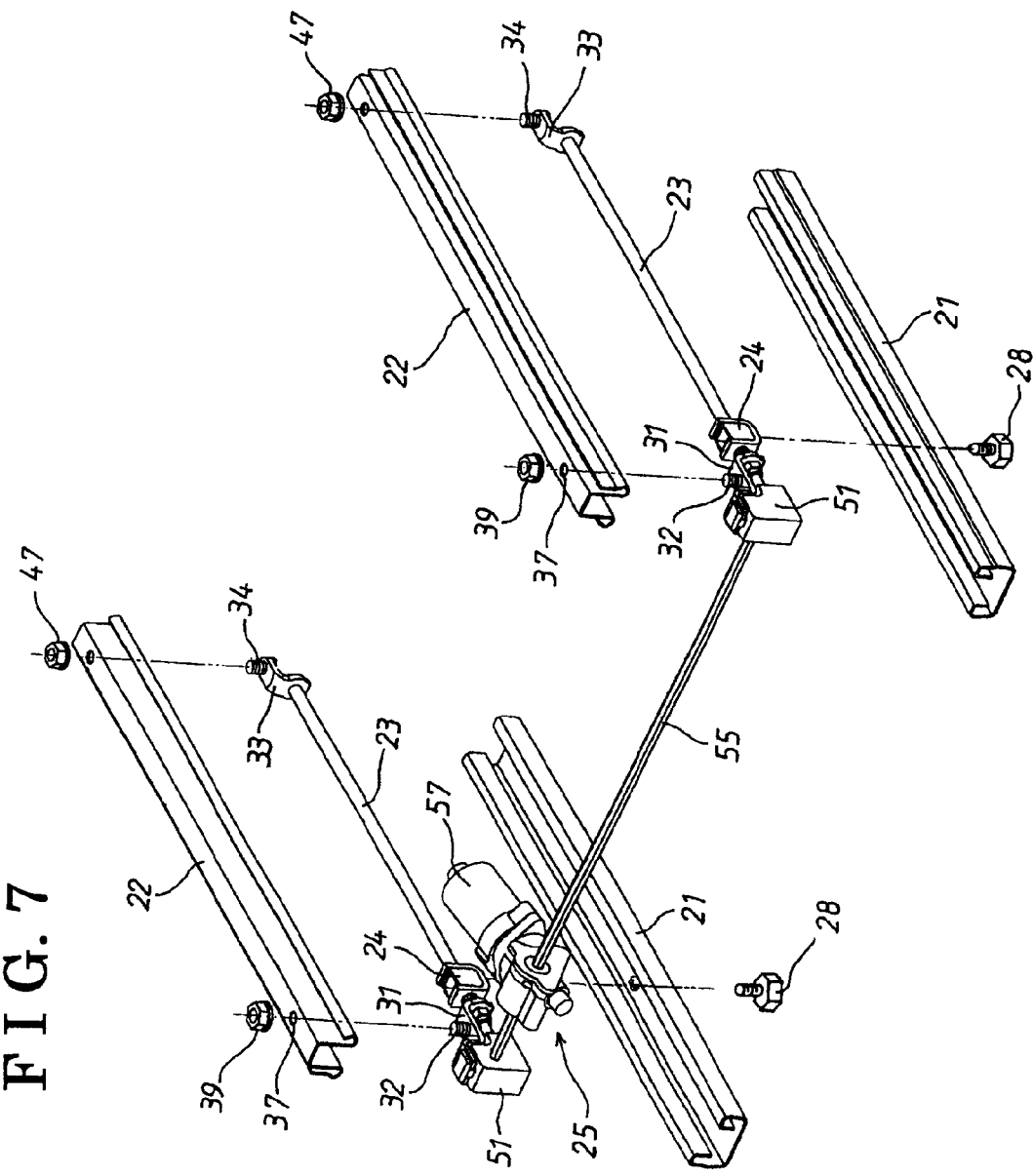
FIG. 7 is an exploded perspective view illustrating an entire power seat slide apparatus.

As shown in FIG. 7, the lower rail 21 is of an elongated shape extending in the vehicle's longitudinal direction and includes a pair of rail members arranged in parallel to each other on the left and right side of the seat 10. As shown in detail in FIG. 4, the lower rail 21 includes a bottom wall 21a and a pair of side walls 21b, 21b each extending upward from left and right ends of the bottom wall 21a, and the lower rail 21 is provided with a pair of flange walls 21c, 21c each bending inward at an upper end of each side wall 21b. The lower rail 21 thus includes an opening 21d opening upward between the flange walls 21c, 21c and has a substantially U-shaped cross section. Front and rear ends of the lower rail 21 are disposed and fixed to the vehicle floor 11 by means of fasteners such as bolts.

As shown in FIG. 7, the upper rail 22 is of an elongated shape extending in the vehicle's longitudinal direction and includes a pair of rail members each arranged in parallel to each other on the left and right side of the seat 10. As shown in detail in FIG. 4, the upper rail 22 includes an upper wall 22a and a pair of side walls 22b, 22b each extending downward from left and right ends of the bottom wall 22a, and the upper rail 22 is provided with a pair of flange walls 22c, 22c bending outward at a lower end of each side wall 22b. The upper rail 22 thus includes an opening 22d opening downward between the flange walls 22c, 22c and has a substantially inverse U-shaped cross section. The side walls 22b, 22b of the upper rail 22 are slidably engaged with the side walls 21b, 21b of the lower rail 21 and the seat cushion 13 of the seat 10 for the vehicle is fixedly mounted on the upper rail 22 via retaining brackets 27 (FIG. 2). The lower rail 21 or the upper rail 22 does not necessarily have to include a pair of rail members arranged on left and right but may include, for example, a rail member or three or more rail members.

Figure 5:
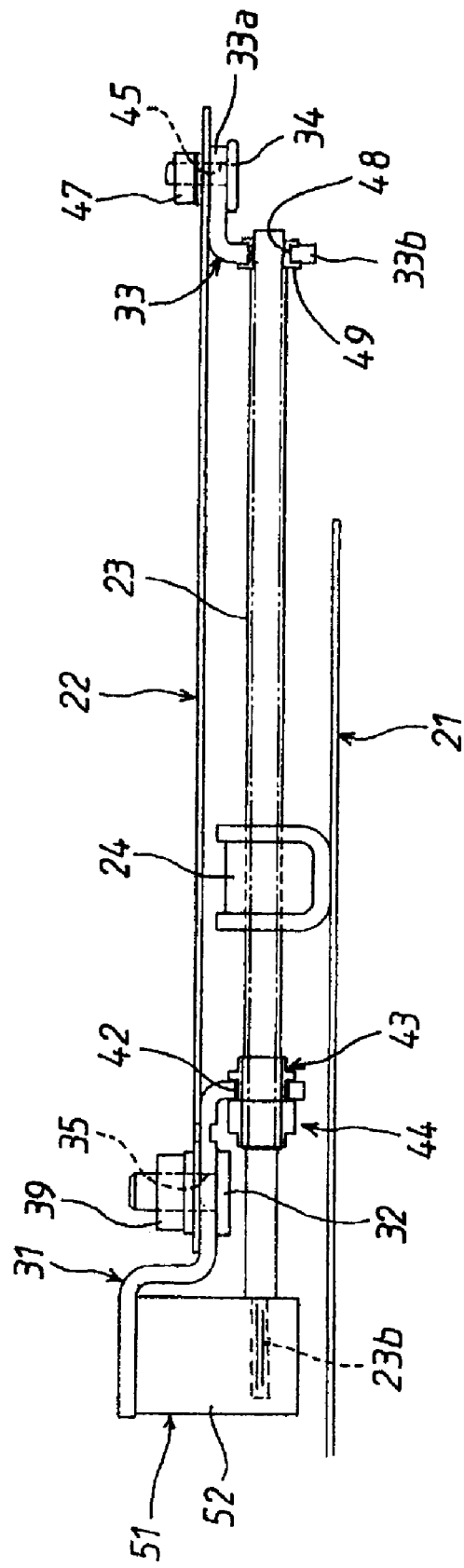
FIG. 5 is a cross section view taken on line V-V of FIG. 3.
Figure 6:
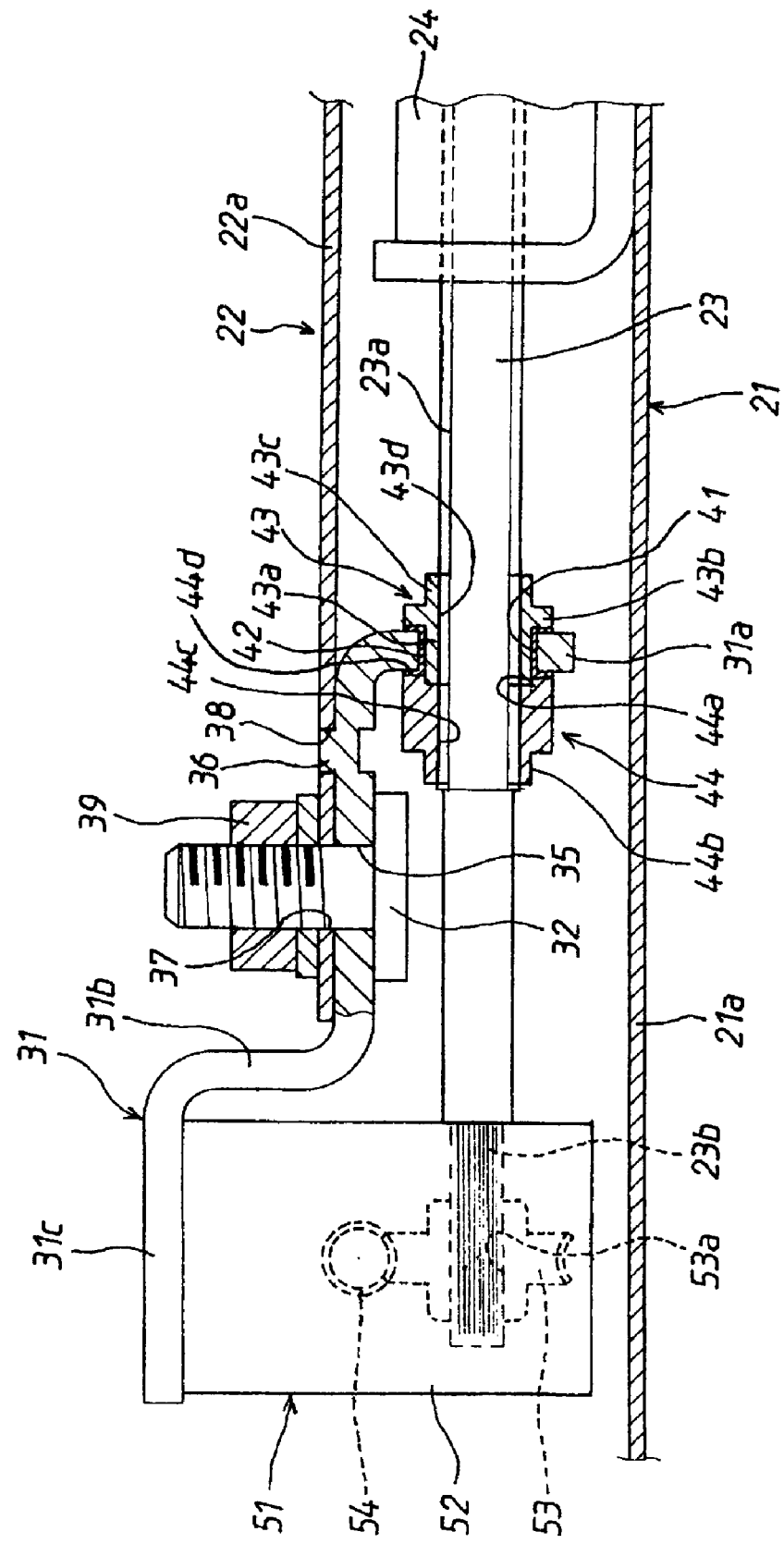
FIG. 6 is an enlarged cross section view illustrating a main part of FIG. 5.

A pair of screw members 23, 23 are arranged between a pair of lower rails 21, 21 each arranged on the left and right side of the seat 10 respectively, and a pair of upper rails 22, 22 each arranged on the left and right of the seat 10 respectively, and the pair of screw members 23 extending axes thereof in the vehicle's longitudinal direction. As shown in FIGS. 5, 6 and 7, the feed nut member 24, fixedly provided on the bottom wall 21a of the lower rail 21 by a bolt 28, is screwed into the screw member 23. Front and rear ends of the screw 23 are supported by the upper rail 22 only rotatably as described herein. The upper rail 22 thereby moves back and forth (i.e. slides) on the lower rail 21 together with the screw member 23 when the screw member 23 is rotated. A structure in which the screw member 23 is supported by the upper rail 22 and a specific constitution of the drive unit 25 will be described hereunder.

As shown in FIGS. 5, 6 and 7, a front end retaining bracket (a first retaining bracket) 31 is fastened by a bolt 32 on a front end portion of the upper rail 22 and a rear end retaining bracket (a second retaining bracket) 33 is fastened by a bolt 34 on a rear end portion of the upper rail 22.

The front end retaining bracket 31 is plate-shaped and is formed with a bolt hole 35 through which the bolt 32 is threaded and formed with a positioning protrusion 36 in the center. A front end portion of the upper wall 22a of the upper rail 22, to which the front end retaining bracket 31 is mounted, is provided with a bolt hole 37 through which the bolt 32 is threaded and provided with a positioning hole 38 into which the positioning protrusion 36 fits. The front end retaining bracket 31 is positioned and fixedly provided on the upper rail 22 by screwing the bolt 32 through the bolt hole 35 of the front end retaining bracket 31 and then through the bolt hole 37 of the upper rail 22, and by screwing the nut 39 onto the bolt 32, while the positioning protrusion 36 is fitted with the positioning hole 38.

A rear end of the front end retaining bracket 31 is bent downward substantially vertically and a vertically bent portion 31a is formed with a through hole 41 through which the screw member 23 is positioned. The through hole 41 has an inner diameter which is sufficiently larger than an outer diameter of the screw member 23 and is fitted with a bush 42 having a recessed cross section. A first slide nut member 43 and a second slide nut member 44 threadably engaged with the screw member 23 are arranged on both sides of the vertically bent portion 31a so as to sandwich the bush 42. The first slide nut member 43 (a first engaging member) includes a fitting cylindrical portion 43a fitted with an inner periphery of the bush 42, a collar portion 43b (a first engaging portion) contacting with a side of the bush 42, a thin walled cylinder portion 43c extending from the collar portion 43b in an opposite direction of the fitting cylindrical portion 43a, and a threaded portion 43d threadably engaged with a male threaded portion 23a formed on an outer surface of the screw 23. The fitting cylindrical portion 43a of the first slide nut member 43 passes through the bush 42 and a front end portion thereof projects forward from the bush 42.

The second slide nut member 44 (a second engaging member) contacting with the other side of the bush 42 includes a fitting recess portion 44a fitting with an end of the fitting cylindrical portion 43a of the first slide nut member 43, a thin walled cylinder 44b extending in an opposite direction of the fitting recess portion 44a, a female threaded portion 44c threadably engaged with a male threaded portion 23a of the screw member 23 and a contact surface 44d (a second engaging portion) contacting with the other side of the bush 42. The first and second slide nut members 43 and 44 are integrally connected with the screw member 23 by crushing the thin walled cylinders 43c and 44b against the screw member 23 thereof respectively, while screwing the bush 42 onto the screw member 23 in a way that the bush 42 is sandwiched between the collar portion 43b and the contact surface 44d in an axial direction. Thereby, the screw member 23 as well as the first slide nut member 43 and the second slide nut member 44 which are integrally connected with the screw member 23 are supported by the front end retaining bracket 31 via the bush 42 so as to rotate in radial and thrust directions.

A front end of the front end retaining bracket 31 is bent upward substantially vertically in front of the upper rail 22, and an end (an upper end) of a vertically bent portion 31b is further bent forward substantially vertically so as to form a horizontal holding portion 31c extending forward in a horizontal direction. A gear box 51 is fixedly mounted on an undersurface of the horizontal holding portion 31c by means of appropriate fasteners such as bolts.

The rear end retaining bracket 33 is bent in an L-shaped form as shown in FIG. 5 and a horizontal portion 33a is provided with a bolt hole 45 through which a bolt 34 is threaded. The rear end portion of the upper rail 22, where the rear end retaining bracket 33 is mounted, is provided with a bolt hole through which the bolt 34 is threaded. The rear end retaining bracket 33 is integrally connected with the upper rail 22 by screwing the bolt 34 through the bolt hole 45 provided on the rear end retaining bracket 33 and through the hole provided on the upper rail 22, respectively, and then by screwing a nut 47 onto the bolt 34.

A vertical portion 33b of the rear end retaining bracket 33 is provided with a through hole 48 through which the screw member 23 is positioned and the rear end retaining bracket 33 is fitted with a bush 49 having a recessed cross section. A rear end of the screw member 23 is rotatably supported by the bush 49. Thereby the screw member 23 threaded into the feed nut member 24 is rotatably supported at two points by the bushes 42 and 49 arranged at the front and rear thereof, respectively.

The gear box 51, fixedly mounted to the undersurface of the front end of the front end retaining bracket 31, is provided with a housing 52 having a worm wheel 53 serving as an output rotating member which is rotatably supported so that the worm wheel 53 and the screw member 23 are coaxially arranged as shown in FIG. 6. A rotation center of the worm wheel 53 is formed with a spline hole (a serration hole) 53a into which a spline engaging portion (a serration engagement portion) 23b formed on a front portion of the screw member 23 is spline-engaged so that the spline engaging portion 23b moves only back and forth. A worm shaft 54 meshing with the worm wheel 53 is supported in the housing 52 so that the worm shaft 54 rotates about an axis line that is perpendicular to an axis line of the worm wheel 53 namely, about a horizontal axis line that is perpendicular in the vehicle's longitudinal direction. The worm wheel 53 and the worm shaft 54 form a reduction gear mechanism As shown in FIG. 3 and FIG. 7, a rotation transmission shaft 55 extending in a vehicle's lateral direction is arranged between the gear boxes 51a, 51a, each arranged on the left and right, and one end of the rotation transmission shaft 55 is connected to the worm shaft 54 supported by the gear box 51 on the left and the other end of the rotation transmission shaft 55 is connected to the worm shaft 45 supported by the gear box 51 on the right. An output shaft of a motor 57 mounted on a connecting frame 56 that connects the upper rails 22, 22 each arranged on the left and right respectively, are rotatably connected to the rotation transmission shaft 55 via a gear mechanism, and thus rotation of the motor 57 is transmitted via the rotation transmission shaft 55 to the worm shafts 54, 54 each arranged on the left and right respectively.

The worm wheels 53, 53 are rotated at a reduced rotation by the worm shafts 54, 54, and the reduced rotation of the worm wheels 53, 53 is transmitted to the screw members 23, 23 which are spline-engaged. Thereby the screw members 23, 23 each arranged on the left and right respectively and threaded into the feed nut members 24, 24 respectively are rotated synchronously, and the upper rails 22, 22 slide longitudinally relative to the lower rails 21, 21. The drive unit 25 includes the motor 57, the rotation transmission shaft 55, and the reduction gear mechanism (a worm and a worm wheel).

Next, operation and movement of parts in the above mentioned first embodiment will be described. The seat 10 for the vehicle is adjusted longitudinally by, for example, actuating the motor 57 in a forward or reverse direction by operating a switch provided by the seat 10 for the vehicle to move the seatback and forth. Thereby the rotation transmission shaft 55 is driven and rotated in the forward or reverse direction, and the rotation thereof is transmitted to the worm shafts 54, 54 in the gear boxes 5 1, 51 each connected to each end of the rotation transmission shaft 55 respectively. Consequently the rotation of the worm shaft 54 rotates the worm wheel 53 serving as the output rotating member and then the rotation of the worm wheel 53 is transmitted to the screw member 23 via the spline engaging portion 23b. As a result, the motor 57 drives and rotates the rotation transmission shaft 55, and the rotation thereof provides reduced rotation to the screw member 23 via the reduction gear mechanism constituted by the worm shaft 54 and the worm wheel 53.

The screw member 23 moves in the axial direction, while rotating, relative to the feed nut member 24 because the screw member 23 is threaded into the feed nut member 24 fixedly mounted on the lower rail 21. This moves the upper rail 22 back and forth via the front end retaining bracket 31 slidably supporting the screw member 23, and a position of the seat 10 for the vehicle is adjusted.

As the screw member 23 is connected with the two slide nut members 43 and 44 that are rotatably supported by the first end retaining bracket 31 via the bush 42, and is not connected rigidly to the worm wheel 53 serving as the output rotating member, a shaft of the screw 23 is stably secured so that slide and rotation thereof is consistently performed. Therefore no engagement noise occurs during adjustment of the position of the seat 10 for the vehicle and the seat is stably moved for adjustment with a constant operation noise.

In a case where a vehicle suddenly stops or collides with another vehicle in front (a frontal collision), or the vehicle is collided by a vehicle from behind (a rear end collisions), a load in a forward or rearward direction acts on the upper rail 22. The load acting on the upper rail 22 is transmitted to the screw member 23 via the front end retaining bracket 31 and the slide nut members 43 and 44, and then transmitted to the lower rail 21 via the feed nut member 24. Therefore the load acting on the upper rail 22 is transmitted to the lower rail 21 fixedly mounted on the vehicle floor 11 without acting on the gear box 51.

Neither does a load transmitted to the screw member 23 act on the gear box 51 because the screw member 23 is, via the spline engaging portion 23b, rotatably connected to the worm wheel 53 provided in the gear box 51 and serving as the output rotating member so as to slide in the axial direction Further, the screw member 23 is held, with a predetermined holding width (a sliding width), by the slide nut members 43 and 44 threadably connected thereto so that the screw member 23 is properly supported by the slide nut members 43 and 44 even if a large load is transmitted to the screw member 23.

As a result, rigidity improves against a load transmitted to the screw member 23, and a structure of the housing 52 of the gear box 51 is required to be robust only to withstand a rotating drive force input from the motor 57 via the rotation transmission shaft 55, which allows the gear box 51 to be simple in structure, achieving reduction in size and weight of, for example, the housing 52.

According to the first embodiment of the present invention described above, the feed nut member 24, which is threaded onto the screw member 23, is fixedly mounted on the lower rail 21, the front end retaining bracket (the first retaining bracket) 31 only rotatably holding the slide nut members 43 and 44 screwed with the screw member 23 is connected to the upper rail 22, and the gear box 51 rotatably supporting the worm wheel 53 serving as the output rotating member transmitting the rotating drive force to the screw member 23 is mounted on the front end bracket 31. The screw member 23 is thereby stably supported by the front end retaining bracket 31 by means of the slide nut members 43 and 44 threadably engaged with the screw member 23, achieving stable sliding and rotation of the screw member 23. As a consequence, changes of the operation noise during adjustment of the position of the seat 10 for the vehicle attributed to, for example, irregular rotation of the screw member 23 is prevented, and the seat is stably adjusted with a constant operation noise.

If a longitudinal load is caused by, for example, sudden stop of a vehicle and the longitudinal load acts on the upper rail 22, the load acting on the upper rail 22 is transmitted to the lower rail 21 via the front end retaining bracket 31, via the slide nut members 43 and 44 and then via the screw member 23, but is less likely to be transmitted to the gear box 51. This enables reduction in size and weight of the gear box 51. In addition, the rigidity of the screw member 23 itself against load is improved by the slide nut members 43 and 44 threadably engaged with the screw member 23.

According to the embodiment of the present invention described above, the slide nut members 43 and 44 are provided with the thin walled cylinders 43c and 44b respectively. The thin walled cylinders 43c and 44b are crushed against the screw member 23 so as to be integrally connected with the screw member 23, and thereby the slide nut members 43 and 44 are integrally connected with the screw member 23 simply and securely.

According to the first embodiment of the present invention described above, the feed nut member 24 is fixedly mounted to the lower rail 21 and the front end retaining bracket 31 holding the screw member 23 is attached to the upper rail 22. As a consequence, the screw member 23 having long length and held by the upper rail 22 is not exposed outside even when the seat 10 moves in the longitudinal direction, which improves safety as well as appearance of the seat 10 for the vehicle.

According to the first embodiment of the present invention described above, the front end retaining bracket 31 is attached to the front end portion of the upper rail 22, the gear box 51 is mounted on the front end portion of the front end retaining bracket 31, the slide nut members 43 and 44 are held on a rear end portion of the front end retaining bracket 31, and as a consequence, a holding mechanism of the screw member 23 as well as a configuration of the feed nut member 24 threaded onto the screw member 23, the gear box 51, and so forth are simplified.

According to the first embodiment of the present invention described above, the front end of the screw member 23 is spline-engaged with the worm wheel 53 supported by the gear box 51 and serving as the output rotating member So that the screw member 23 moves only back and forth As a result, the gear engagement between the worm shaft 54 and the worm wheel 53 inside the gear box 51 does not interact with the thread engagement between the screw member 23 and the feed nut member 24 and, for example, an occurrence of the noise attributed to the engagement is restrained when the seat is slid by the motor, achieving a silent and stable sliding motion of the seat.

Further, even if the load acting on the upper rail 22 in the longitudinal direction is transmitted to the screw member 23, the load is not transmitted to the worm wheel 53 because the screw member 23 and the worm wheel 53 are spline-engaged. As a result, the worm wheel 53 in the gear box 51 is only required to be robust to transmit the rotating drive force, achieving the simple configuration.

According to the first embodiment of the present invention described above, a rear portion of the screw member 23 is rotatably held by the rear end retaining bracket 33 (the second retaining bracket) attached to the upper rail 22, the screw member 23 is supported at two points in addition to a portion where the screw member 23 and the worm wheel 53 are rotatably connected, achieving a stable rotating and sliding motion of the screw member 23.

Figure 8:
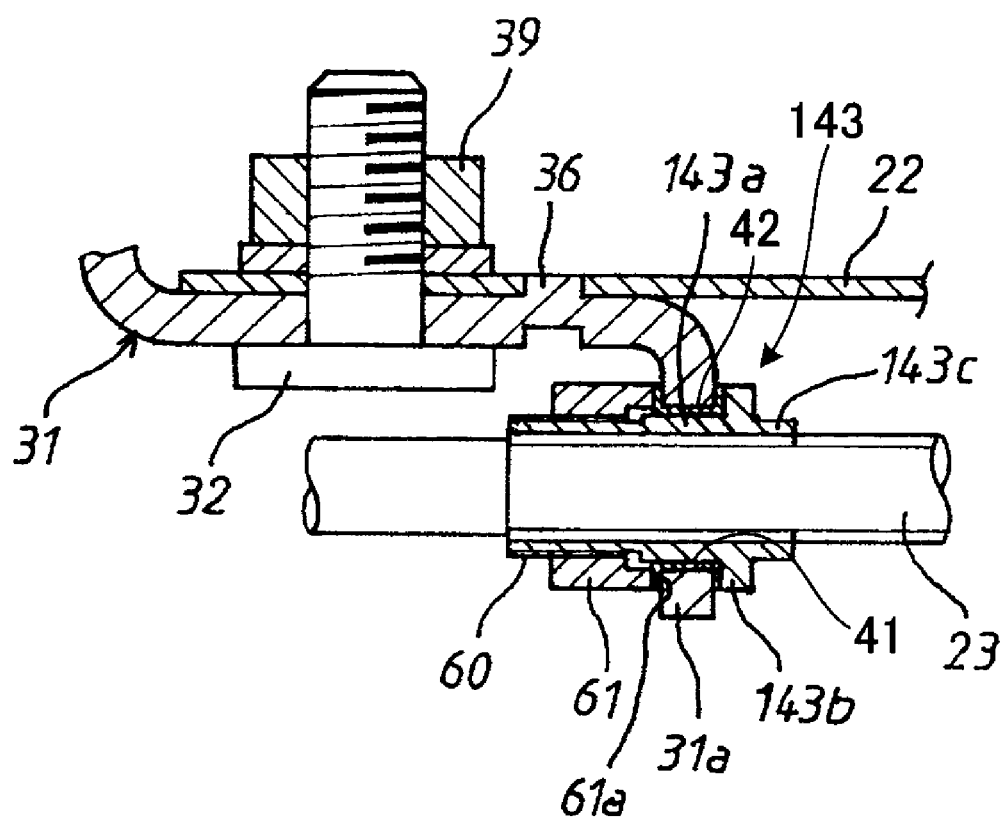
FIG. 8 is a cross section view illustrating a main part of a power seat slide apparatus according to a second embodiment of the present invention.

FIG. 8 illustrates a second embodiment of the invention, where the screw member 23 is held by a slide nut member 143. That is, the vertically bent portion 31*a* of the front end retaining bracket 31 is formed with the through hole 41 where the bush 42 is fitted. The bush 42 with the recessed cross section has an inner diameter that is sufficiently larger than the outer diameter of the screw member 23. The slide nut member 143 (the first engaging member) threadably engaged with the screw member 23 is fitted into the bush 42. The slide nut member 143 is formed with a fitting cylindrical portion 143*a* fitted in the inner periphery of the bush 42 and passing therethrough, a collar portion 143*b* contacting with a side of the bush 42 and a thin walled cylinder 143*c* extending from the collar portion 143*b* in the opposite direction of the fitting cylindrical portion 143*a*.

An outer periphery of an end of the slide nut member 143 is formed with a threaded portion 60 with which a fastening nut 61 (the second engaging member) is threadably engaged. Both ends of the bush 42 are sandwiched between the collar portion 143*b* of the slide nut member 143 and a contact surface 61*a* (the second engaging portion) of the fastening nut 61 in the axial direction. While maintaining the above state, the thin walled cylinder 143 is crushed against the screw member 23 so that the slide nut member 143 is integrally connected with the screw member 23. The screw member 23 is thereby stably supported by the front end retaining bracket 31 by means of the slide nut member 143 having a sufficient holding width (a sliding width), achieving the stable slide and rotation of the screw member 23.

Other part of the structure is the same as that of the first embodiment, therefore identical parts and components are designated by the same reference numerals, and their description is omitted.

According to the second embodiment of the present invention described above, the screw member 23 as well as the slide nut member 143 threadably engaged with the screw member 23 and the fastening nut 61 threadably engaged with the slide nut member 143 are supported by the front end retaining bracket 31 via the bush 42 so as to rotate in radial and thrust directions. As a consequence, the screw member 23 is stably supported by the slide nut member 143 threadably engaged with the screw member 23 and the fastening nut 61 threadably engaged with the slide nut member 143.

In the above described embodiment, the drive unit 25 driven by the motor 57 and the screw member 23 rotated by the drive unit 25 are provided on the upper rail 22, and the feed nut member 24 threaded onto the screw member 23 is provided on the lower rail 21. However, the drive unit 25 and the screw member 23 may be supported on the lower rail 21 and the feed nut member 24 threaded onto the screw member 23 may be fixedly attached on the upper rail 22.

In the above described embodiment, the front and rear ends of the screw member 23 are supported at two points, namely by the front end retaining bracket (the first retaining bracket) 31 and by the rear end retaining bracket (the second retaining bracket) 33, respectively. However, the rear end retaining bracket (the second retaining bracket) 33 may be omitted in cases where a slide nut member or two slide nut members rotatably supported on the front end retaining bracket (the first retaining bracket) 31 assure stable sliding motion of the screw member 23.

Further, in the above described embodiment, the screw member 23 is spline-engaged with the worm wheel 53 housed in the gear box 51, however, the output rotating member, spline-engaged with the screw member 23, is not limited to the worm and a worm wheel mechanism and may be other mechanisms which transmit an output of the motor 57 to the screw member 23 by means of a rotation transmission, While the embodiments of the present invention are herein described, it is to be understood that the invention is not to be limited to the above described embodiments and that many changes can be made in the above mentioned embodiments without departing from the principles of the invention.

According to the subject matter of the power seat slide apparatus, the power seat slide apparatus includes the feed nut member 24 arranged on one of the lower rail 22 and the upper rail 21 and threaded onto the screw member 23, the retaining bracket 31, 33 which is arranged on the other one of the lower rail 21 and the upper rail 22 respectively and in which the screw member 23 is positioned, and the first slide nut member 43, 143, and the second slide nut member 44 or the fastening nut member 61 arranged on the screw member 23 opposing each other via the retaining bracket 31. As, a consequence, the screw member 23 is stably rotated by the first slide nut member 43, 143, and by the second slide nut member 44 or the fastening nut member 61 arranged on the screw member 23, and changes in operation noise during adjustment of seat position attributed to, for example, irregular rotation of the members such as the screw member is prevented.

According to the subject matter of the power seat slide apparatus, the first slide nut member 43, 143, and the second slide nut member 44 or the fastening nut member 61 include a plurality of nut members arranged opposing one another via the retaining bracket 31. One of the plurality of nut members is threadably engaged with the screw member 23 so as to be integrally connected therewith.

According to the subject matter of the power seat slide apparatus, the first slide nut member 43, 143, and the second slide nut member 44 or the fastening nut member 61 include the plurality of nut members arranged opposing one another via the retaining bracket 31. One of the plurality of nut members is threadably engaged with the screw member 23 so as to be integrally connected therewith. As a consequence, the sufficient sliding width is assured by the nut members and the stable rotation of the screw member 23 is further more enhanced.

According to the subject matter of the power seat slide apparatus, the first slide nut member 43 and the second slide nut member 44 are threadably engaged with the screw member 23. The first slide nut member 43 includes the fitting cylindrical portion 43a positioned in the through hole 41 formed on the retaining bracket 31 in which the screw member 23 is positioned and the collar portion 43b engaged with the retaining bracket 31. The second slide nut member 44 includes the fitting recess portion 44a into which the fitting cylindrical portion 43a is fitted and the contact surface 44d which is engaged with the retaining bracket 31.

According to the subject matter of the power seat slide apparatus, the first slide nut member 43 and the second slide nut member 44 are threadably engaged with the screw member 23. The first slide nut member 43 includes the fitting cylindrical portion 43a positioned in the through hole 41 formed on the retaining bracket 31 in which the screw member 23 is positioned and the collar portion 43b engaged with the retaining bracket 31. The second slide nut member 44 includes the fitting recess portion 44a into which the fitting cylindrical portion 43a is fitted and the contact surface 44d which is engaged with the retaining bracket 31. As a consequence, the collar portion 43b and the contact surface 44d of the first slide nut member 43 and the second slide nut member 44 respectively, are engaged with the retaining bracket 31, and thus enhancing the stable rotation of the screw member 23.

According to the subject matter of the power seat slide apparatus, the first slide nut member 143 is threadably engaged with the screw member 23 and the fastening nut member 61 is threadably engaged with the first slide nut member 143. The first slide nut member 143 includes the fitting cylindrical portion 143a positioned in the through hole 41 formed on the retaining bracket 31 in which the screw member 23 is positioned and the collar portion 143b engaged with the retaining bracket 31. The fastening nut member 61 includes the contact surface 61a engaged with the retaining bracket 31.

According to the subject matter of the power seat slide apparatus, the first slide nut member 143 is threadably engaged with the screw member 23 and the fastening nut member 61 is threadably engaged with the first slide nut member 143. The first slide nut member 143 includes the fitting cylindrical portion 143a positioned in the through hole 41 formed on the retaining bracket 31 in which the screw member 23 is positioned and the collar portion 143b engaged with the retaining bracket 31. The fastening nut member 61 includes the contact surface 61a engaged with the retaining bracket 31. As a consequence, the collar portion 143b of the first slide nut member 143 threadably engaged with the screw member 23 and the contact surface 61a of the fastening nut member 61 threadably engaged with the first slide nut member 143 are engaged with the retaining bracket 31. The stable rotation of the screw member 23 is thereby enhanced by the first slide nut member 143 and the fastening nut member 61.

According to the subject matter of the power seat slide apparatus, the retaining bracket 31, 33 includes the first retaining bracket 31 mounted on the gear box 51 which rotatably supports the worm wheel 53 rotatably connected to the screw member 23.

According to the subject matter of the power seat slide apparatus, the feed nut member 24 is arranged on the lower rail 21 and the front end retaining bracket 31 is connected to the front portion of the upper rail 22, and the front portion of the front end retaining bracket 31 is mounted to the gear box 51 and the rear portion thereof retains the first slide nut member 43, 143, and the second slide nut member 44 or the fastening nut member 61.

According to the subject matter of the power seat slide apparatus, the feed nut member 24 is arranged on the lower rail 21 and the front end retaining bracket 31 is connected to the front portion of the upper rail 22, and the front portion of the front end retaining bracket 31 is mounted to the gear box 51 and the rear portion thereof retains the first slide nut member 43, 143, and the second slide nut member 44 or the fastening nut member 61. As a consequence, the holding mechanism of the screw member 23 as well as the configuration of the feed nut member 24 threaded onto the screw member 23, the gear box 51, and so forth are simplified.

According to the subject matter of the power seat slide apparatus, the retaining bracket 31, 33 includes the rear end retaining bracket 33 connected to the upper rail 22 and rotatably holding the rear portion of the screw member 23.

According to the subject matter of the power seat slide apparatus, the retaining bracket 31, 33 includes the rear end retaining bracket 33 connected to the upper rail 22 and rotatably holding the rear portion of the screw member 23. As a consequence, the screw member 23 is supported at two points in addition to the portion where the screw member 23 and the worm wheel 53 are rotatably connected, achieving the stable rotating and sliding motion of the screw member 23.

According to the subject matter of the power seat slide apparatus, the front end portion of the screw member 23 is slidably spline-engaged with the worm wheel 53.

According to the subject matter of the power seat slide apparatus, the front end portion of the screw member 23 is slidably spline-engaged with the worm wheel 53. As a consequence, the gear engagement of the reduction gear mechanism, such as the worm and worm wheel mechanism, does not interact with the thread engagement between the screw member 23 and the feed nut member 24, and, for example, an occurrence of the noise attributed to the engagement is restrained when the seat is slid by the motor, achieving the silent and stable sliding motion of the seat.

Further, even if the load acting on the upper rail 22 in the longitudinal direction is transmitted to the screw member 23, the load is not transmitted to the worm wheel 53 because the screw member 23 and the worm wheel 53 are spline-engaged. As a result, the worm wheel 53 in the gear box 51 is only required to be robust to transmit the rotating drive force, achieving the simple configuration.

According to the subject matter of the power seat slide apparatus, at least one of the first slide nut member 43, 143, and the second slide nut member 44 or the fastening nut member 61 is provided with the thin walled cylinder portion 43c, 143c threadably engaged with the screw member 23 and the thin walled cylinder portion 43c, 143c is crushed against the screw member 23 so as to be integrally connected with the screw member 23.

According to the subject matter of the power seat slide apparatus, at least one of the first slide nut member 43, 143, and the second slide nut member 44 or the fastening nut member 61 is provided with the thin walled cylinder portion 43c, 143c threadably engaged with the screw member 23 and the thin walled cylinder portion 43c, 143c is crushed against the screw member 23 so as to be integrally connected with the screw member 23. As a consequence, at least one of the first slide nut member 43, 143, and the second slide nut member 44 or the fastening nut member 61 is integrally connected with the screw member 23 simply and securely.

According to the subject matter of the power seat slide apparatus, the feed nut member 24 is arranged on the lower rail 21 and the retaining bracket 31, 33 is attached to the upper rail 21.

According to the subject matter of the power seat slide apparatus, the feed nut member 24 is arranged on the lower rail 21 and the retaining bracket 31, 33 retaining the screw member 23 is attached to the upper rail 22. As a consequence, the screw member 23 having long length and arranged on the upper rail 22 is not exposed outside even when the seat 10 moves in the longitudinal direction, which improves safety as well as appearance of the seat 10 for the vehicle.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fill within the spirit and scope of the present invention as defined in the claims, be embraced thereby.

The invention claimed is:

1. A power seat slide apparatus, comprising;
   a lower rail adapted to be provided on a floor of a vehicle;
   an upper rail slidably supported by the lower rail and adapted to support a seat for a vehicle;
   a screw member supported by the upper rail and the lower rail;
   a feed nut member arranged on one of the lower rail and the upper rail and threaded onto the screw member;
   a retaining bracket arranged on the other one of the lower rail and the upper rail and the screw member being positioned in the retaining bracket;
   a first engaging member and a second engaging member arranged on the screw member so as to oppose each other via the retaining bracket and cooperatively sandwiching the retaining bracket in an axial direction of the screw member; and
   a drive unit transmitting a rotating drive force to the screw member,
   wherein the first engaging member and the second engaging member include a plurality of nut members arranged opposing one another via the retaining bracket, one of the plurality of nut members being threadably engaged with the screw member so as to be integrally connected therewith.

2. The power seat slide apparatus according to claim 1, wherein the first engaging member and the second engaging member are threadably engaged with the screw member, the first engaging member includes a cylindrical portion positioned in a hole formed on the retaining bracket in which the screw member is positioned and a first engaging portion engaged with the retaining bracket and wherein the second engaging member includes a recess portion into which the cylindrical portion is fitted and a second engaging portion engaged with the retaining bracket.

3. The power seat slide apparatus according to claim 1, wherein the first engaging member is threadably engaged with the screw member, the second engaging member is threadably engaged with the first engaging member, the first engaging member includes a cylindrical portion positioned in a hole formed on the retaining bracket in which the screw member is positioned and a first engaging portion engaged with the retaining bracket, and wherein the second engaging member includes a second engaging portion engaged with the retaining bracket.

4. The power seat slide apparatus according to claim 1, wherein the retaining bracket includes a first retaining bracket mounted on a gear box which rotatably supports an output rotating member rotatably connected to the screw member.

5. The power seat slide apparatus according to claim 4, wherein the feed nut member is arranged on the lower rail and the first retaining bracket is connected to a front portion of the upper rail, and a front portion of the first retaining bracket is mounted to the gear box and a rear portion thereof retains the first engaging member and the second engaging member.

6. The power seat slide apparatus according to claim 5, wherein the retaining bracket includes a second retaining bracket connected to the upper rail and rotatably holding a rear portion of the screw member.

7. The power seat slide apparatus according to claim 4, wherein a front end portion of the screw member is slidably spline-engaged with the output rotating member.

8. The power seat slide apparatus according to claim 5, wherein a front end portion of the screw member is slidably spline-engaged with the output rotating member.

9. The power seat slide apparatus according to claim 6, wherein a front end portion of the screw member is slidably spline-engaged with the output rotating member.

10. The power seat slide apparatus according to claim 1, wherein at least one of the first engaging member and the second engaging member is provided with a thin walled cylinder portion threadably engaged with the screw member and the thin walled cylinder portion is crushed so as to be integrally connected with the screw member.

11. The power seat slide apparatus according to claim 4, wherein at least one of the first engaging member and the second engaging member is provided with a thin walled cylinder portion threadably engaged with the screw member and the thin walled cylinder portion is crushed so as to be integrally connected with the screw member.

12. The power seat slide apparatus according to claim 5, wherein at least one of the first engaging member and the second engaging member is provided with a thin walled cylinder portion threadably engaged with the screw member and the thin walled cylinder portion is crushed so as to be integrally connected with the screw member.

13. The power seat slide apparatus according to claim 6, wherein at least one of the first engaging member and the second engaging member is provided with a thin walled cylinder portion threadably engaged with the screw member and the thin walled cylinder portion is crushed so as to be integrally connected with the screw member.

14. The power seat slide apparatus according to claim 7, wherein at least one of the first engaging member and the second engaging member is provided with a thin walled cylinder portion threadably engaged with the screw member and the thin walled cylinder portion is crushed so as to be integrally connected with the screw member.

15. The power seat slide apparatus according to claim 1, wherein the feed nut member is arranged on the lower rail and the retaining bracket is attached to the upper rail.

* * * * *